(12) United States Patent
Walter et al.

(10) Patent No.: US 12,489,337 B2
(45) Date of Patent: Dec. 2, 2025

(54) MECHANICALLY FIXING CIRCUIT BOARDS IN A MOTOR

(71) Applicant: ebm-papst Mulfingen GmbH & Co. KG, Mulfingen (DE)

(72) Inventors: Manuel Walter, Schwäbisch Hall (DE); Tobias Letter, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 421 days.

(21) Appl. No.: 18/337,893

(22) Filed: Jun. 20, 2023

(65) Prior Publication Data

US 2024/0022142 A1    Jan. 18, 2024

(51) Int. Cl.
  *H02K 5/24* (2006.01)
  *H02K 11/33* (2016.01)
  *H05K 7/20* (2006.01)

(52) U.S. Cl.
  CPC .............. *H02K 5/24* (2013.01); *H02K 11/33* (2016.01); *H02K 2211/03* (2013.01); *H05K 7/205* (2013.01)

(58) Field of Classification Search
  CPC .. H02K 5/00; H02K 5/02; H02K 5/04; H02K 5/06; H02K 5/08; H02K 5/10; H02K 5/22; H02K 5/24; H02K 11/33; H02K 2211/03; H05K 5/006; H05K 7/205
  USPC .......................................................... 310/89
  See application file for complete search history.

(56) References Cited

U.S. PATENT DOCUMENTS

| 8,975,793 B2 * | 3/2015 | Palfenier ................ H02K 7/116 310/68 B |
| 10,348,156 B2 | 7/2019 | Stewart et al. |
| 2017/0237312 A1 * | 8/2017 | Stewart .................. H02K 11/33 310/68 B |

FOREIGN PATENT DOCUMENTS

| CN | 113765303 A | 12/2021 |
| DE | 102011080178 A1 | 2/2013 |
| DE | 102014004262 A1 | 9/2015 |
| EP | 1361644 B1 | 10/2009 |

OTHER PUBLICATIONS

European Search Report for Patent Application No. 23179199.7, dated Nov. 29, 2023, 7 pages.

(Continued)

*Primary Examiner* — Alexander A Singh
(74) *Attorney, Agent, or Firm* — Christopher J. Volkmann; KELLY, HOLT & CHRISTENSON PLLC

(57) ABSTRACT

An apparatus for fixing a printed circuit board within a housing of an electric motor, comprising a first housing part, a second housing part, and an insulation part. The insulation part is arranged between the first housing part and the second housing part, such that the housing parts are spaced apart from one another at least in certain portions by the insulation part, including a hard component part and a soft component part. The insulation part comprises at least one spring element for exerting a pressing force on the first housing part. The hard component part comprises at least one hold-down means, having at least one pressure-exerting element. The soft component part is configured to provide a seal between the housing parts. The spring element is arranged on that side of the insulation part which lies opposite to a stop region in the direction of the holding force.

17 Claims, 5 Drawing Sheets

(56) References Cited

OTHER PUBLICATIONS

International Search Report for German Patent Application No. 102022115567.6 dated Jun. 22, 2023, 6 pages.

* cited by examiner

MECHANICALLY FIXING CIRCUIT BOARDS IN A MOTOR

DETAILED DESCRIPTION

Figure 1:
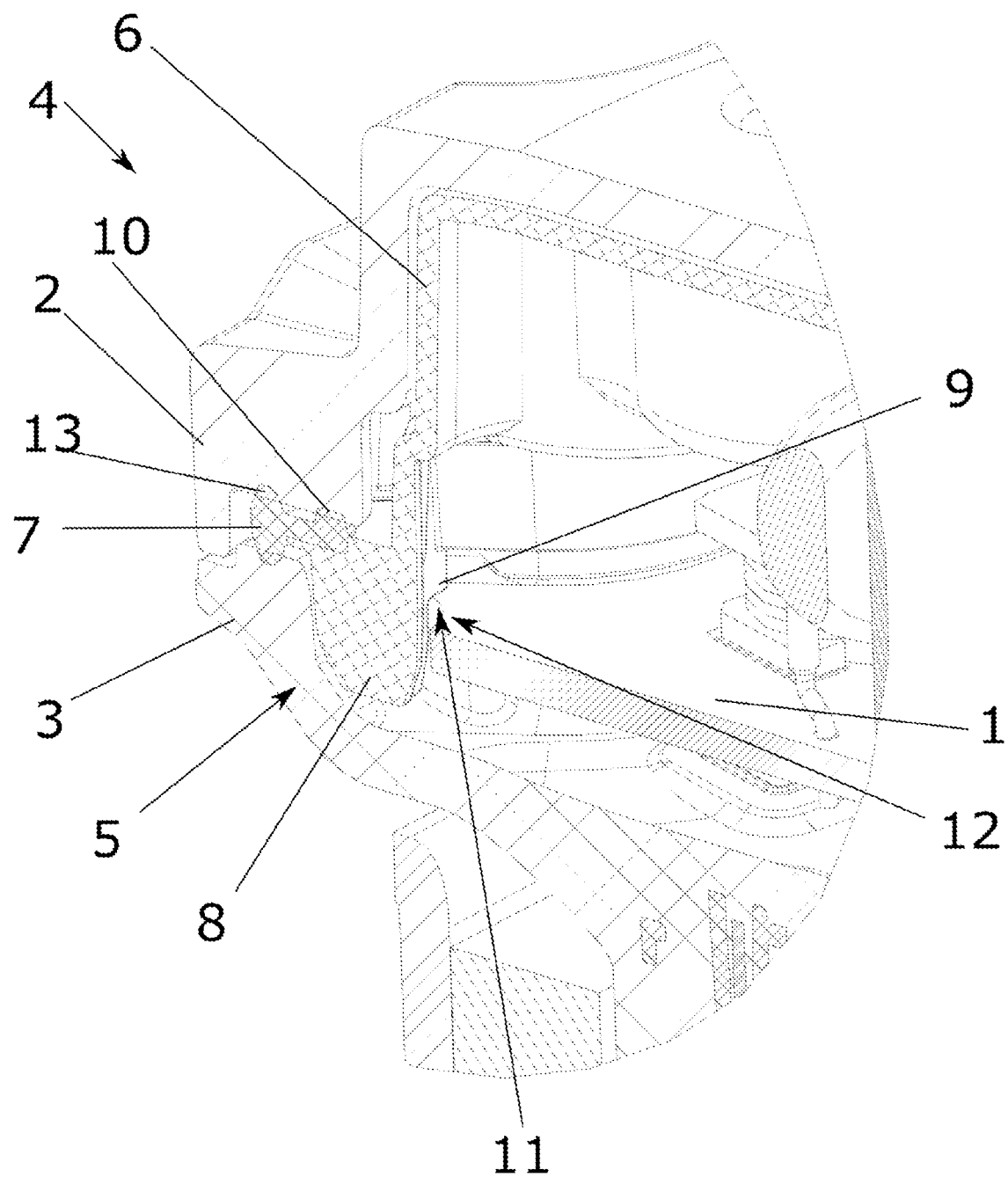
FIG. 1 shows a perspective detail view of an apparatus in one example.

The present disclosure relates to the technical field of the mechanical fixing of printed circuit boards in a motor.

In order to minimize the forces which occur at electrical contacts of printed circuit boards during operation of an electric motor in the event of shock loads and vibrational loads, the printed circuit boards are usually fixed and held down in the stator in the stator in a mechanical manner by means of heat sinks fastened to a flange or to an electronics housing.

Here, heat-conducting materials of the gap pad type are generally inserted between the components to be cooled and the heat sinks. These gap pads are compressed by the heat sink, as a result of which the corresponding holding-down force is generated.

Other ways of fixing the printed circuit board are, on the one hand, the screwing-on of the printed circuit board in the flange and thus the pre-mounting as a control unit, or, on the other hand, the screwing-on of the printed circuit board in the stator.

The attachment in the sense of adhesive bonding of the gap pads entails time and cost disadvantages in the manufacturing process, since this must be effected and, as a result, a fully automated production process is retarded and hindered. In the case of full automation, a metered-on gap filler is only of limited advantage, since this, in contrast to gap pads, does not allow printed circuit boards to be held down.

The technical object of the present disclosure is to find an alternative option for fixing printed circuit boards in an electric motor.

The technical object is achieved by means of an article having the technical features according to the independent claim. The dependent claims, the description and the drawings provide advantageous embodiments.

In the context of the disclosure, a hard component part is understood to mean a component composed of a plastic, for example a thermoplastic, and a soft component part is understood to mean a component composed of a plastic, for example a thermoplastic elastomer, which is elastic and has a lower hardness. Here, the soft component part is injected as second component onto the hard component part in a two-component injection-molding method.

According to one aspect, the object of the disclosure is achieved by means of an apparatus for fixing a printed circuit board within a housing of an electric motor, comprising a first housing part, a second housing part, and an insulation part, wherein the insulation part is arranged between the first housing part and the second housing part, such that the housing parts are spaced apart from one another at least in certain portions by means of the insulation part, wherein the insulation part comprises a hard component part and a soft component part, wherein the insulation part comprises at least one spring element for exerting a pressing force on the first housing part, wherein the hard component part comprises at least one hold-down means, wherein the hold-down means has at least one pressure-exerting element, for exerting a holding force on the printed circuit board, wherein the soft component part is configured to provide a seal between the housing parts, wherein, in the region of the hold-down means, the spring element is arranged on that side of the insulation part which lies opposite to a stop region in the direction of the holding force.

In the case of a fully automated manufacturing process, it is possible to omit adhesive bonding of a gap pad and to enable application of a gap filler in an advantageous manner. Holding down of the printed circuit board can be enabled, in spite of the paste-like consistency of the gap filler, by means of the insulation part. Further parts and additional mounting costs can be omitted and a rapid and cost-saving production process can be enabled.

In a technically advantageous embodiment of the apparatus, provision is made for the spring element to be configured as a thickening of the soft component part, wherein in particular the spring force of the spring element is formed in dependence on the geometry of the spring element.

This makes it possible to save on an additional step in the production process by preventing an additional attachment or shaping of the spring element. It is possible, in a cost-effective manner and in a manner that is advantageously conducive to a fully automated production process, for the spring element to in each case be adapted in the production process according to the requirements and for its physical properties to be configured flexibly. By way of example, the spring element may be of cylindrical configuration in order to exhibit a linear spring force in the case of a compression, or may for example be of tapered configuration in order to exhibit an appropriate spring force gradient for the respective requirement.

In a further technically advantageous embodiment of the apparatus, provision is made for the soft component part to at least partially be configured as a sealing element, in particular as a sealing lip.

This makes it possible to save on further costs of additional components and to prevent the insertion and connection of further components.

In a further technically advantageous embodiment of the apparatus, provision is made for a pressing force of the first housing part and of the second housing part, said pressing force acting on the sealing element in the mounted state, to be decoupled, in particular by means of the soft component part, from a holding force of the pressure-exerting element, said holding force acting on the printed circuit board in the mounted state.

This advantageously makes it possible, for example during the flange-connection of the housing parts, to select a pressing force independently of the pressing force which allows the printed circuit board to be held down. In this way, optimal fixing of the printed circuit board can be enabled in a targeted manner, and at the same time optimal closing or sealing of the housing parts can be enabled.

Furthermore, in a technically advantageous embodiment of the apparatus, provision is made for the hold-down means to have at least one stop region for axially fixing the printed circuit board.

In this way, optimal fixing of the printed circuit board in further spatial directions can be enabled, which can provide an improved stability and can prevent undesired slipping of the printed circuit board during operation of the motor.

In addition, in a technically advantageous embodiment of the apparatus, provision is made for the hold-down means to have a guide region, in particular a protrusion or web, for laterally positioning the insulation part within the housing parts.

In the case of the fully automated manufacturing process, such a guide region can permit greater error tolerances during the assembly of the apparatus and thus a more rapid manufacturing process, since the individual components can cooperate in a self-orienting manner.

Furthermore, in a technically advantageous embodiment of the apparatus, provision is made for the soft component part, together with the hard component part of the insulation part, to at least in certain portions be configured as an integral component, in particular as a two-component injection-molded part.

This makes it possible to save on additional production steps and production methods, since not only can a lower number of individual components be used but these can also be produced in a cost-effective manner.

Furthermore, in a technically advantageous embodiment of the apparatus, provision is made for the hold-down means to be configured in one part, in particular in a materially integral manner on the hard component part, preferably as a resilient region of the hard component part.

This advantageously allows an improved stability of the insulation part, since any connection points can be omitted.

In addition, in a technically advantageous embodiment of the apparatus, provision is made for the insulation part to at least partially be formed from an electrically or thermally insulating material, in particular plastic.

Advantageously, this makes it possible to adapt the insulation part to region-dependent requirements of the construction in an individual and flexible manner and to use cost-effective materials.

Furthermore, in a technically advantageous embodiment of the apparatus, provision is made for the second housing part to be configured as a stator of the motor or to be able to accommodate a stator of the motor in an interior space.

This can make it possible to be able to omit an additional counterpart of the housing part and to attach the housing part to already existing structures of the electric motor.

In a further technically advantageous embodiment of the apparatus, provision is made for the holding force on the printed circuit board to correspond, in terms of its direction of action, to a force acting in an axial direction of the motor.

It is thus possible to improve the fixing of the printed circuit board and to simplify a mounting carried out in the axial direction of the motor.

FIG. 1 shows a perspective detail view of an apparatus for fixing a printed circuit board within a housing of an electric motor. In this mounted state, an insulation part is located between a first housing part and a second housing part, such that the housing parts are spaced apart from one another.

The insulation part, which is illustrated as an integral component, comprises a hard component part, a soft component part, and a spring element. The spring element is configured as a thickening of the soft component part for the purpose of exerting a pressing force on the first housing part. The soft component part is configured as a sealing lip for the purpose of providing a seal between the housing parts. The hard component part comprises a hold-down means formed in one part thereon, said hold-down means having a pressure-exerting element for exerting a holding force on the printed circuit board and a stop region for axially fixing the printed circuit board.

What is furthermore illustrated is that, in the region of the hold-down means, the spring element is arranged on that side of the insulation part which lies opposite to a stop region in the direction of the holding force, wherein the holding force on the printed circuit board corresponds, in terms of its direction of action, to a force acting in the axial direction of the motor.

Figure 2:
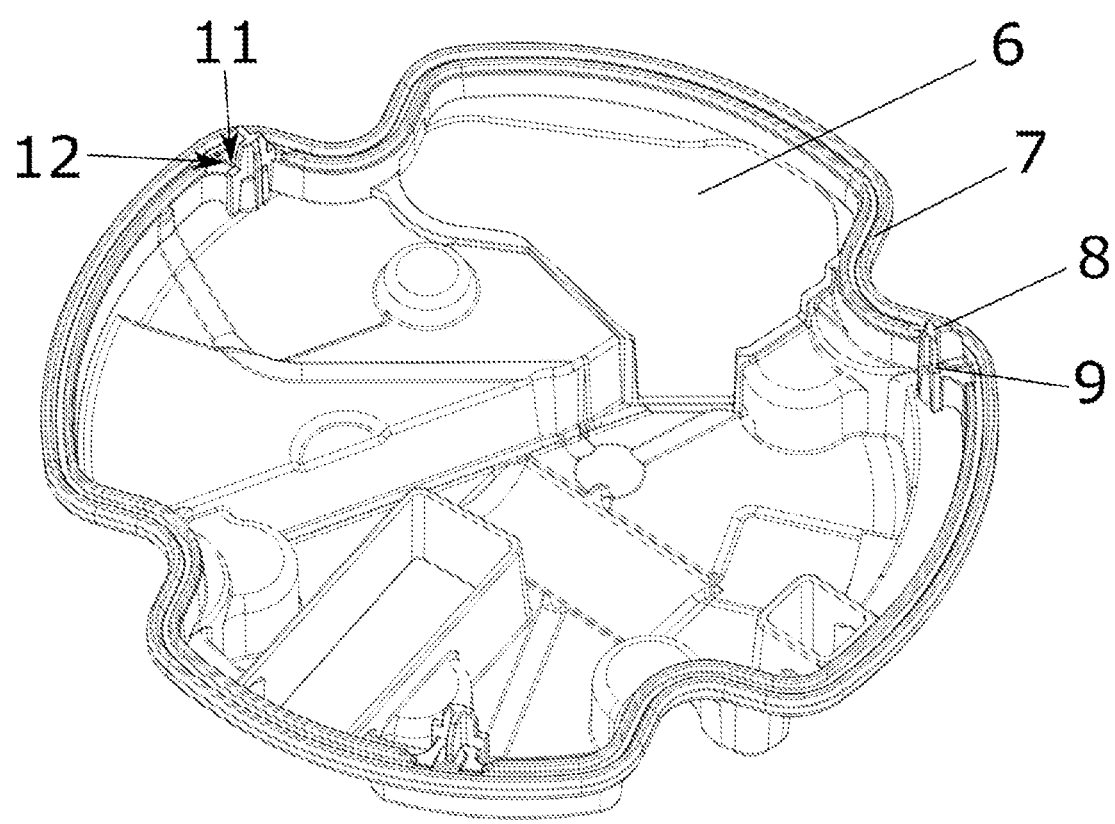
FIG. 2 shows a perspective illustration of a top side of the insulation part.
Figure 3:
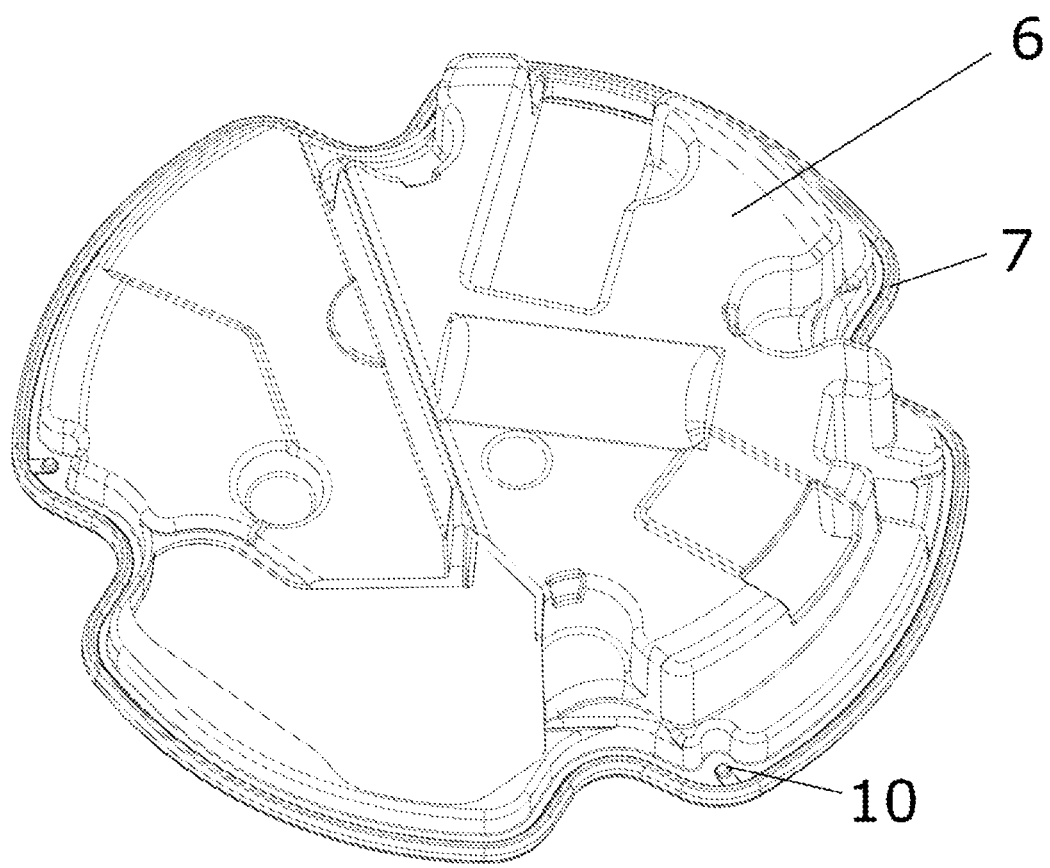
FIG. 3 shows a perspective illustration of a bottom side of the insulation part, said bottom side lying opposite to the top side shown in FIG. 2.

FIGS. 2 and 3 each illustrate a perspective illustration of the insulation part. FIG. 2 illustrates a lower side of the insulation part and FIG. 3 illustrates an upper side of the insulation part, said upper side lying opposite to said lower side. Viewing FIGS. 2 and 3 together, it is possible to see the soft component part, the hard component part, hold-down means, pressure-exerting elements, spring elements, and also stop region and guide region. Furthermore, it is apparent when viewing FIGS. 2 and 3 together in this way that, in the region of the hold-down means, the spring element is arranged on that side of the insulation part which lies opposite to a stop region in the direction of the holding force.

Figure 4:
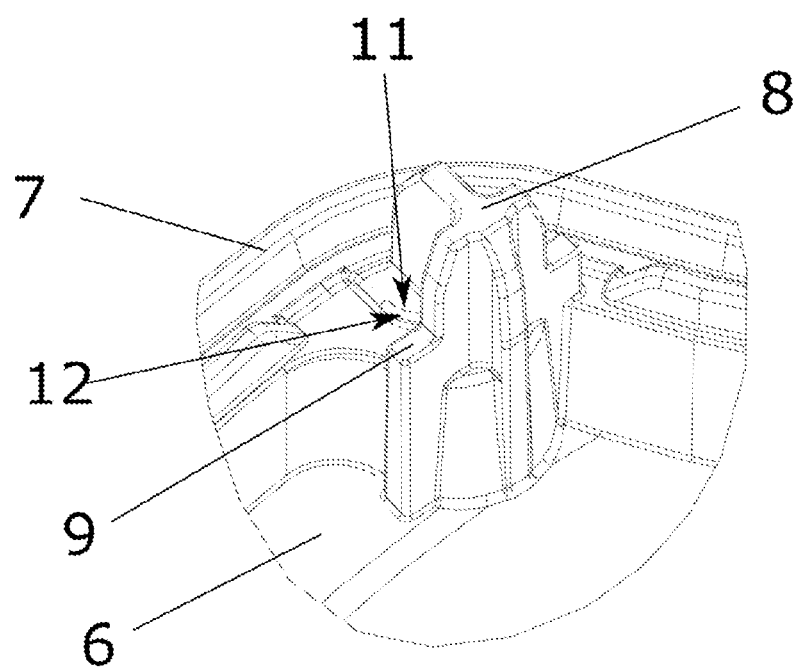
FIG. 4 shows a detail view of the pressure-exerting element.

FIG. 4 illustrates a detail view of a pressure-exerting element already illustrated in FIG. 2. It is possible to see the hard component part, the soft component part, the guide region, the pressure-exerting element, and the hold-down means.

Figure 5:
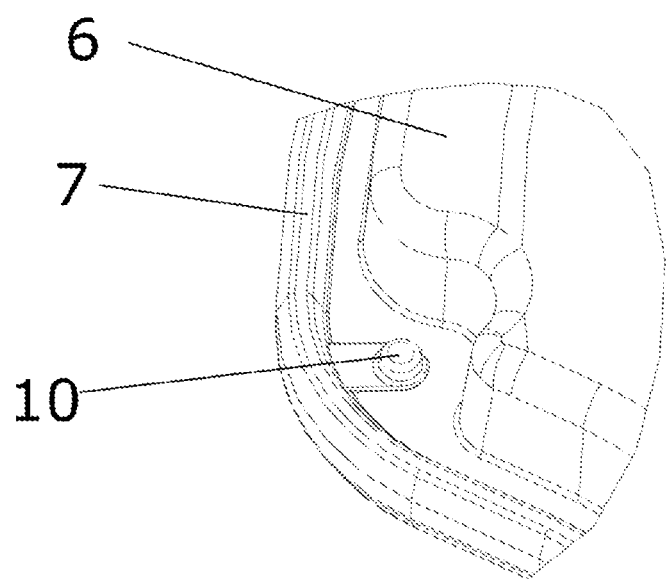
FIG. 5 shows a detail view of the spring element.

FIG. 5 illustrates a detail view of a spring element already illustrated in FIG. 3. Here, too, it is possible to see the hard component part and the soft component part, the spring element being configured as a thickening of the soft component part and being formed integrally therewith.

LIST OF REFERENCE SIGNS

1 Printed circuit board
2 First housing part
3 Second housing part
4 Motor
5 Insulation part
6 Hard component part
7 Soft component part
8 Hold-down means
9 Pressure-exerting element
10 Spring element
11 Stop region
12 Guide region

The invention claimed is:

1. An apparatus for fixing a printed circuit board within a housing of an electric motor, comprising
a first housing part,
a second housing part,
and an insulation part,
wherein the insulation part is arranged between the first housing part and the second housing part, such that the housing parts are spaced apart from one another at least in certain portions by means of the insulation part,
wherein the insulation part comprises a hard component part and a soft component part,
wherein the insulation part comprises at least one spring element for exerting a pressing force on the first housing part,
wherein the hard component part comprises at least one hold-down means, wherein the hold-down means has at least one pressure-exerting element, for exerting a holding force on the printed circuit board, wherein the soft component part is configured to provide a seal between the housing parts, wherein, in the region of the hold-down means, the spring element is arranged on that side of the insulation part which lies opposite to a stop region in the direction of the holding force.

2. The apparatus according to claim 1, wherein the spring element is configured as a thickening of the soft component part, wherein the spring force of the spring element is formed in dependence on the geometry of the spring element.

3. The apparatus according to claim 1, wherein the soft component part is at least partially configured as a sealing element.

4. The apparatus according to claim 3, wherein the sealing element comprises a sealing lip.

5. The apparatus according to claim 1, wherein a pressing force of the first housing part and of the second housing part, said pressing force acting on the sealing element in the mounted state, is decoupled, by means of the soft component part, from a holding force of the pressure-exerting element, said holding force acting on the printed circuit board in the mounted state.

6. The apparatus according to claim 1, wherein the stop region is at least partially configured on the hold-down means.

7. The apparatus according to claim 6, wherein the stop region is at least partially configured for axially fixing the printed circuit board.

8. The apparatus according to claim 1, wherein the hold-down means has a guide region.

9. The apparatus according to claim 8, wherein the guide region comprises a protrusion or web.

10. The apparatus according to claim 1, wherein the soft component part, together with the hard component part of the insulation part, is at least in certain portions configured as an integral component.

11. The apparatus according to claim 10, wherein the integral component comprises a two-component injection-molded part.

12. The apparatus according to claim 1, wherein the hold-down means is configured in a materially integral manner on the hard component part.

13. The apparatus according to claim 12, wherein the hold-down means is configured as a resilient region of the hard component part.

14. The apparatus according to claim 1, wherein the insulation part is at least partially formed from an electrically or thermally insulating material.

15. The apparatus according to claim 14, wherein the insulation part is at least partially formed from a plastic material.

16. The apparatus according to claim 1, wherein the second housing part is configured as a stator of the motor or is able to accommodate a stator of the motor in an interior space.

17. The apparatus according to claim 1, wherein the holding force on the printed circuit board corresponds, in terms of its direction of action, to a force acting in an axial direction of the motor.

* * * * *